United States Patent
Torsten

(10) Patent No.: US 8,967,942 B2
(45) Date of Patent: Mar. 3, 2015

(54) CONTAINER FILLING PLANT HAVING A DEVICE FOR STACKING PRODUCT GROUPS OR SETS, AND A DEVICE FOR STACKING PRODUCT GROUPS OR SETS IN A CONTAINER FILLING PLANT, AND A DEVICE FOR STACKING PRODUCT GROUPS OR SETS

(75) Inventor: Maiweg Torsten, Goch (DE)

(73) Assignee: KHS GmbH, Dortmund (DE)

( * ) Notice: Subject to any disclaimer, the term of this patent is extended or adjusted under 35 U.S.C. 154(b) by 264 days.

(21) Appl. No.: 12/860,232

(22) Filed: Aug. 20, 2010

(65) Prior Publication Data
US 2011/0038702 A1 Feb. 17, 2011

Related U.S. Application Data

(63) Continuation-in-part of application No. PCT/EP2009/000853, filed on Feb. 6, 2009.

(30) Foreign Application Priority Data

Feb. 20, 2008 (DE) .......................... 10 2008 010 259

(51) Int. Cl.
*B65H 15/00* (2006.01)
*B65G 57/30* (2006.01)
(52) U.S. Cl.
CPC .................................... *B65G 57/303* (2013.01)
USPC ................... 414/789.3; 414/789.9; 414/788.9
(58) Field of Classification Search
CPC ............................. B65G 57/32; B65G 57/303
USPC ................. 414/788.9, 789.3, 789.9; 198/435, 198/457.01, 457.02, 459.6, 459.7
See application file for complete search history.

(56) References Cited

U.S. PATENT DOCUMENTS

| | | | |
|---|---|---|---|
| 1,557,765 A | | 10/1925 | Nicholas |
| 1,901,928 A | * | 3/1933 | Olson ........................ 198/463.2 |
| 2,857,052 A | * | 10/1958 | Searle ........................... 210/209 |

(Continued)

FOREIGN PATENT DOCUMENTS

| | | |
|---|---|---|
| DE | 33 12 006 A1 | 10/1984 |
| DE | 35 29 071 C2 | 2/1986 |
| DE | 205 146 | 10/1986 |

OTHER PUBLICATIONS

International Search Report PCT/EP2009/000853 and English translation thereof.

(Continued)

*Primary Examiner* — Saul Rodriguez
*Assistant Examiner* — Lynn Schwenning
(74) *Attorney, Agent, or Firm* — Nils H. Ljungman & Associates

(57) ABSTRACT

A product group stacking arrangement having a conveying arrangement that can continuously move in a substantially horizontal transport direction, and having a gripping and lifting device for gripping and lifting product groups. In operation, the gripping and lifting device grips a first product group being moved by the conveying arrangement at a stacking position, and then raises the first product group substantially solely in a vertical direction away from the conveying arrangement, and then lowers the first product group substantially solely in the vertical direction onto a subsequent, second product group being continuously moved by the conveying arrangement through the stacking position.

16 Claims, 7 Drawing Sheets

(56) References Cited

U.S. PATENT DOCUMENTS

| | | | |
|---|---|---|---|
| 2,919,821 A * | 1/1960 | Young | 414/790 |
| 2,948,382 A * | 8/1960 | Russell | 414/789.9 |
| 3,035,716 A * | 5/1962 | Lamb et al. | 414/788.9 |
| 3,037,645 A * | 6/1962 | Simpkins | 414/789.9 |
| 3,057,486 A * | 10/1962 | Moulthrop et al. | 414/795.3 |
| 3,506,109 A * | 4/1970 | Braas | 198/418.4 |
| 3,765,546 A * | 10/1973 | Westerling | 414/795.2 |
| 3,866,763 A * | 2/1975 | Alduk | 414/790.1 |
| 4,042,125 A * | 8/1977 | Falkinger et al. | 414/790.1 |
| 4,212,579 A | 7/1980 | Stromberg | |
| 4,646,908 A | 3/1987 | Gambetti | |
| 4,917,229 A * | 4/1990 | Korkowski | 198/418.4 |
| 5,882,176 A * | 3/1999 | Marcoux | 414/795.3 |
| 6,048,163 A * | 4/2000 | Atkinson | 414/788.9 |
| 6,135,705 A * | 10/2000 | Katoch | 414/795 |
| 6,422,806 B1 * | 7/2002 | Jenkins et al. | 414/795.2 |
| 6,431,817 B1 * | 8/2002 | Simkowski | 414/796.9 |
| 7,014,414 B2 * | 3/2006 | Forhaug et al. | 414/795.2 |
| 2008/0019819 A1 * | 1/2008 | Reed | 414/791.6 |
| 2008/0124208 A1 * | 5/2008 | Ouellette et al. | 414/799 |

OTHER PUBLICATIONS

German Office Action 10 2008 010 259.8-22.

* cited by examiner

CONTAINER FILLING PLANT HAVING A DEVICE FOR STACKING PRODUCT GROUPS OR SETS, AND A DEVICE FOR STACKING PRODUCT GROUPS OR SETS IN A CONTAINER FILLING PLANT, AND A DEVICE FOR STACKING PRODUCT GROUPS OR SETS

CONTINUING APPLICATION DATA

This application is a Continuation-In-Part application of International Patent Application No. PCT/EP2009/000853, filed on Feb. 6, 2009, which claims priority from Federal Republic of Germany Patent Application No. 10 2008 010 259.8, filed on Feb. 20, 2008. International Patent Application No. PCT/EP2009/000853 was pending as of the filing date of this application. The United States was an elected state in International Patent Application No. PCT/EP2009/000853.

BACKGROUND 1. Technical Field

The present application relates to a container filling plant having a device for stacking product groups or sets, and a device for stacking product groups or sets in a container filling plant, and a device for stacking product groups or sets.
2. Background Information Background information is for informational purposes only and does not necessarily admit that subsequently mentioned information and publications are prior art.

For example in the area of foodstuffs and beverages, but also in many other areas of the economy, for example in the area of pharmacy and cosmetics, it is usual to combine packaging filled with the respective product, e.g. bags, tubes, containers, such as, for example cans or bottles, to form product groups or sets. In many cases here it is also desirable to stack these types of product groups, for example for storage and/or transport, i.e. to form an at least two-layered product group stack in each case from at least two product groups, said product group stack then, for example, being transported, stored or prepared for sale in this form, or being assembled with a plurality of similar-type product groups or product set stacks for storage and/or transport etc. to form a larger stack.

OBJECT OR OBJECTS

It is an object of the present application to provide a device which enables stacking of product groups with a simplified structural embodiment and a high level of operating reliability.

SUMMARY

The present application relates to a device for stacking product groups. The device may comprise a transport section for supplying the product groups in an at least single-lane product group flow and for discharging the product groups stacked to form a product group stack, as well as a device on the transport section to form the product group stack.

This object may be achieved with a device for stacking product groups. The device may comprise a transport section for supplying the product groups in an at least single-lane product group flow and for discharging the product groups stacked to form a product group stack, as well as a device on the transport section to form the product group stack. The device to form the product group stack may be a gripping and lifting device with at least one gripping head, which is moveable in a controlled manner up and down in the vertical or substantially vertical direction such that a leading product group, in each case of two product groups following one another in the conveying direction of the transport section, is engaged and raised by the gripping head at a stacking position and is then deposited onto a following product group that has reached the stacking position.

In the case of the device according to the present application, the stacking of the product groups is effected in line by using a gripping and lifting device with at least one gripping head, i.e. without the need and/or desire for a lateral turning of the product groups transversely to the conveying direction, as well as, in a manner, as they pass through, i.e. with the device driven in a continuous or quasi continuous manner. Just a vertical or substantially vertical lifting movement is sufficient then for the at least one gripping head.

Further developments, embodiments and application possibilities of the present application are also produced from the following description of possible embodiments and from the Figures. In this case, features described and/or graphically represented are, in principle, objects of the present application individually or in arbitrary combination.

The above-discussed embodiments of the present invention will be described further herein below. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The present application is described below by way of the Figures of a possible embodiment, in which, in detail.

DESCRIPTION OF EMBODIMENT OR EMBODIMENTS

Figure 1:
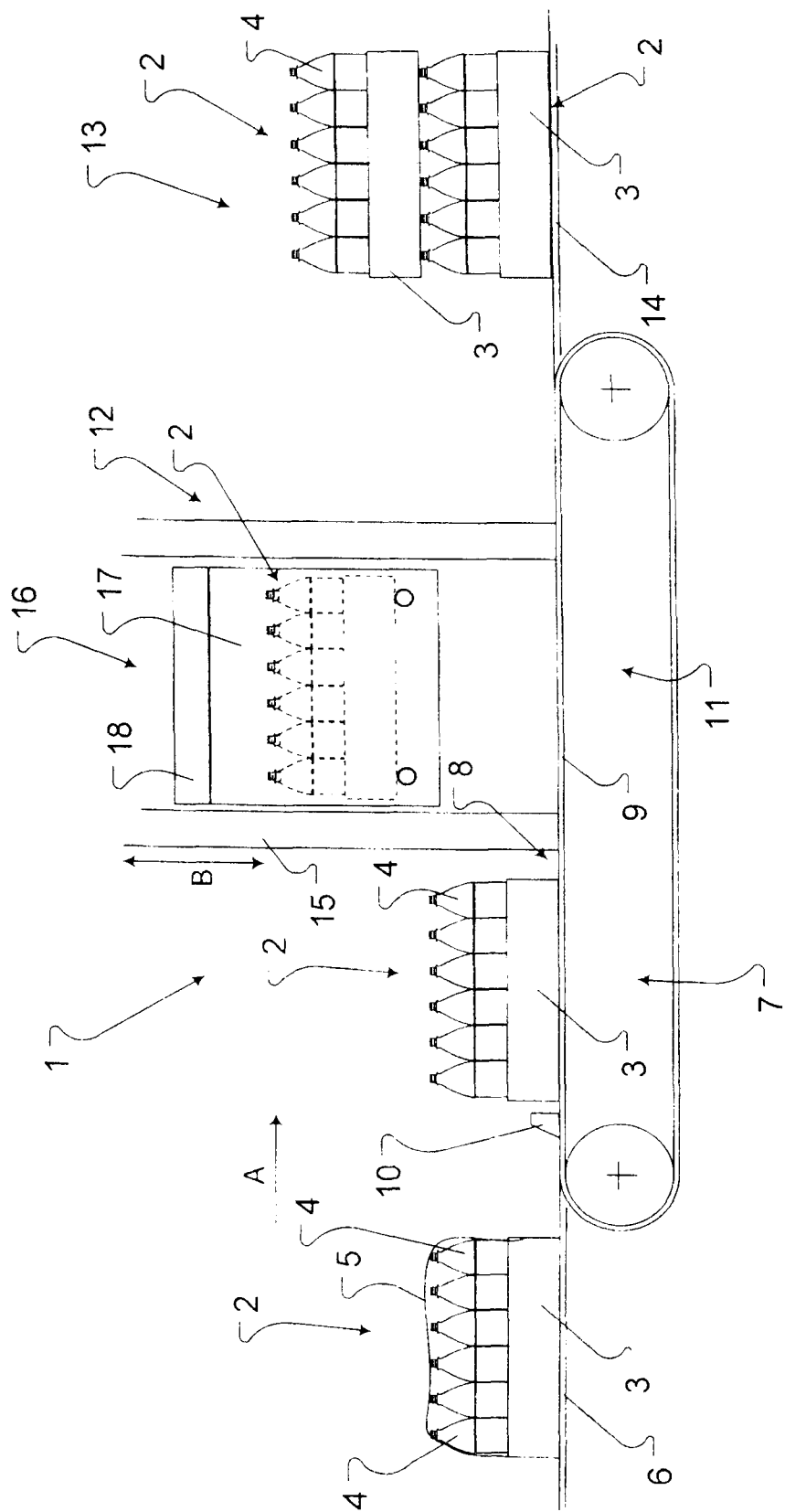
FIG. 1 shows a simplified representation and side view of a device for stacking product groups or sets.

The device, given the general reference of 1 in the Figures, is for stacking product groups or sets 2, each of which has a plurality of containers in the form of bottles 4 that are arranged on a carrier or tray 3. In each set 2 the bottles 4 are provided in a plurality of rows on the carrier 3 standing upright and are held together there, for example, by means of shrunken shrink film 5, thus forming the set.

For stacking, as shown in FIG. 1, the sets 2 are supplied to the device 1 or to a standby position 7 of said device by means of an external conveyor 6 in a horizontal or substantially horizontal manner as a single-lane set flow (arrow A). By means of a device-internal conveyor 8, which, in the possible embodiment represented, is produced from a plurality of parallel or substantially parallel transport chains 9 with entrainment means 10, each set 2 standing by at the standby position 7 is moved to a stacking position 11 or into the effective range of a gripping and lifting device 12 at that location.

The transport chains 9 each form loops, which are provided oriented with their loop plane in the vertical or substantially vertical direction, in parallel or substantially parallel and spaced apart and which, with the upper length of each loop, form a base for the sets 2, on which base said sets stand by way of the underside of their carrier 3.

The gripping and lifting device 12 is realized such that, in each case, from two sets 2 supplied by the conveyor 6 following one another in the conveying direction A, the leading set 2 is raised by the gripping and lifting device 12 in the vertical or substantially vertical direction at the stacking position 11 and is subsequently deposited onto the following set 2 being conveyed to the stacking position 11 by way of the conveyor 8 (double arrow B). Consequently, a set stack 13 is formed, produced in each case from two sets 2, said set stack then being moved by way of the conveyor 8 onto an external conveyor 14 or a transport table, by means of which said set stacks 13 are supplied to a further use.

The stacking of the sets 2 to form the set stacks 13 is effected in line, i.e. with no lateral turning of the sets 2, and in a continuous or substantially continuous process, i.e. the sets 2 are continuously or substantially continuously supplied to the device 1 by means of the external conveyor 6 and are continuously or substantially continuously moved by way of the internal conveyor 8 to the stacking position 11, it being essentially ensured or promoted purely through corresponding, represented means, for example blocking, that, in each case, of the two sets 2 following one after the other in the conveying direction A, the second, i.e. the set 2 following in the transport direction A, reaches the stacking position 11 when the leading set 2 in the conveying direction A has already been lifted by way of the gripping and lifting device 12 into a position above the path of movement of the following set 2. The depositing of the set, raised by way of the gripping and lifting device 12, onto the bottom set standing by at the stacking position 11 and the ejecting of the sets is also effected in a continuous or substantially continuous manner.

In more detail, the gripping and lifting device 12 comprises, among other things, a gripping head 16, which is moveable up and down in a controlled manner in the vertical or substantially vertical direction on a device frame 15 with two lateral guide sections or walls 17, which are interconnected at the top side of the gripping head 16 in a suitable manner through at least one crossbeam 18. The guide walls 17 or the guiding means formed by said guide walls are located parallel or substantially parallel to one another and at a spacing from one another in vertical or substantially vertical planes parallel or substantially parallel to the conveying direction A. The spacing between the guide walls 17 or between the guiding means formed by said guide walls is adapted to the width of the sets 2 in the horizontal or substantially horizontal direction and perpendicular or substantially horizontal to the conveying direction A. The lifting movement (double arrow B) of the gripping head 16 is effected, for example, by means of a mechanical drive.

In one possible embodiment of the present application, the gripping head 16 may be configured to grip a package 2 from above the package 2 and lift the package 2 in the packing station 11. The entrainment means or entrainment arrangement 19 may be configured to move below a package 2 and support the package 2 in the stacking station 11 of the stacking device 12.

Figure 1A:
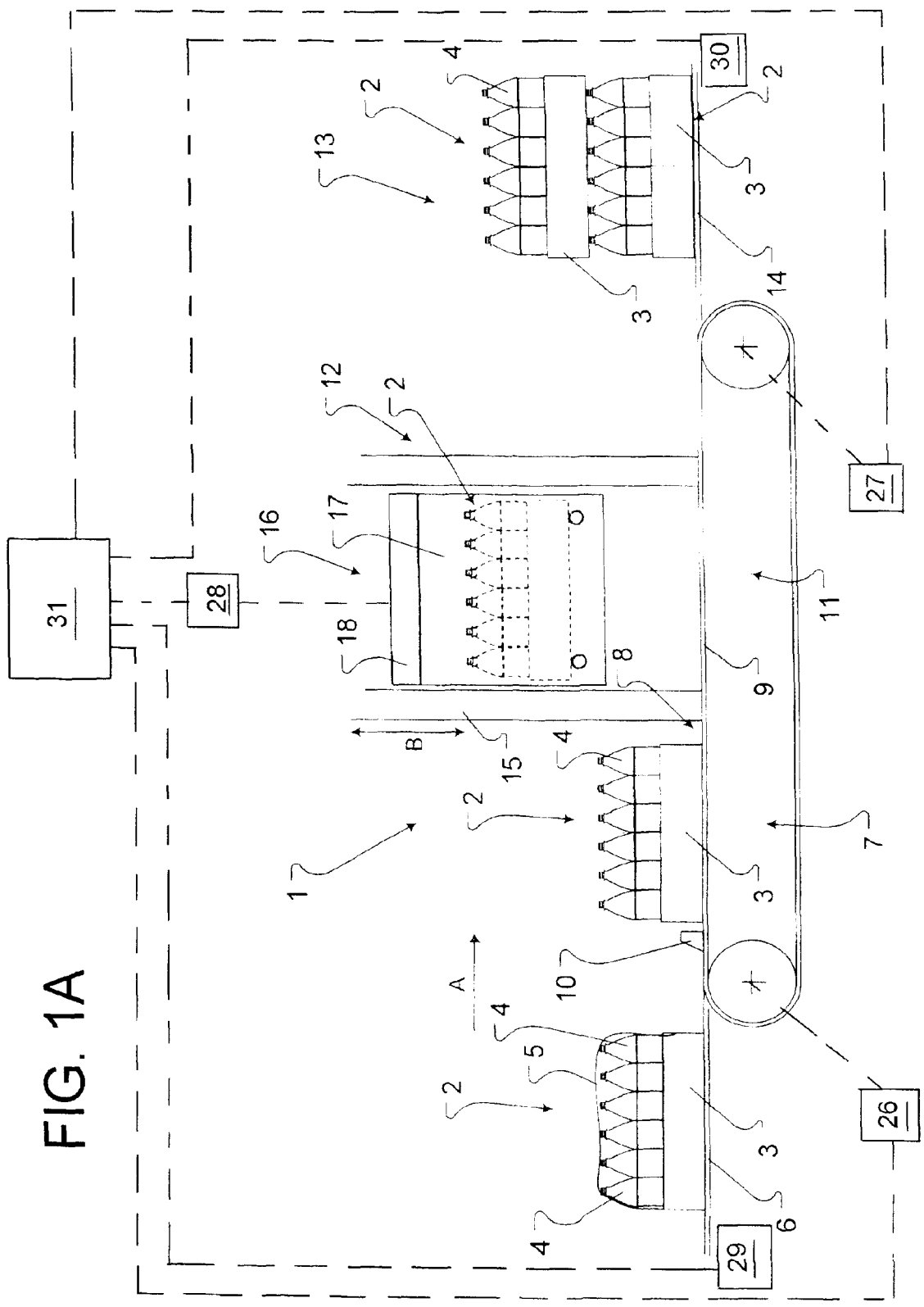
FIG. 1A shows another simplified representation and side view of a device for stacking product groups or sets.

FIG. 1A shows a device 1 for placing groups 2 of bottles 4 onto subsequent groups 2 and producing stacks 13. The embodiment seen in FIG. 1A may show additional components, for example drives 26 and 27, drive 28, position sensors 29 and 30, and a computer or control system 31.

The drives 26 and 27 may be operatively connected to the plurality of drive chains 9. The drives 26 and 27 may be configured and disposed to drive the chains 9 and transport groups or packages 2 from the standby position 7 to the stacking position 11. The drives 26 and 27 may be controlled and/or monitored by the control device 31.

The gripping and lifting device 12 and/or the gripping head 16 may be controlled by a drive 28. The drive 28 may be operatively connected to the gripping and lifting device 12 and/or the gripping head 16. The drive 28 may be configured and disposed to raise and lower the gripping head 16 in the lifting direction B. The drive 28 may be controlled and/or monitored by the control device 31.

The device 1 may also comprise position sensors 29 and 30. The position sensors 29 and 30 may be controlled and/or monitored by the control device 31, and may be configured and disposed to sense the position and/or speed of the packages or sets 2 as the groups 2 are moved in the conveying direction A along the conveyors 6, 9, and 14. As the control device 31 detects or monitors the conveying of packages 2, the control device 31 may control the speed of the drives 26, 27, and 28 to stack groups 2 on top of one another with the device 1.

Two grippers or entrainment means 19 are provided in each case in the region of the bottom edge on the guiding walls 17, said grippers or entrainment means being movable in a synchronous or substantially synchronous manner with the movement of the conveyor 8 and also in a synchronous or substantially synchronous manner with the lifting movement of the gripping head 16 in a controlled manner between an inoperative position, in which the entrainment means 19 are moved out of the space between the guiding walls 17, and an operative position in which the entrainment means 19 extend into the space between the guiding walls 17 in such a manner that said entrainment means 19, when the respective set is lifted up, abut against the bottom of said set or of the relevant carrier 3.

A positioning element 20 is provided in each case on the gripping head 16 on the open side facing the standby position 7 or the conveyor 14. These are also controlled in a synchronous or substantially synchronous manner with the movement of the conveyor 8 and with the lifting movement of the gripping head 16, between an operative and an inoperative position. In the case of the embodiment represented, the positioning elements 20 are pivotable brackets, which in their operative position precisely or substantially precisely position the set 2 located in the gripping head 16 prior to depositing it onto the bottom set 2 of the set stack in each case and consequently, among other things, essentially ensure or promote that the sets are arranged in each set stack 13 in an aligned manner, for example congruently one above the other.

Just like the entrainment means 19, the positioning elements 20 are also actuated for example by cylinders, e.g. pneumatic cylinders.

The entrainment means 19 may also be expressed by an engagement means 19, a cam 19, fixtures 19, a driver 19, a carrier 19, a dog 19, a lathe dog 19, a catch 19, a flight attachment 19, a tang 19, a square 19, a tappet 19, a follower 19, a striker 19, a carrier plate 19, a gripper 19, an engaging piece 19, engagement means 19, or a projection 19 from the gripping head 16.

In order to achieve a lifting of the sets 2 by way of the gripping head 16 in as instantaneous a manner as possible and in order to achieve as high an output as possible for the device 1 (number of sets 2 processed per unit time), the control of the gripping and lifting device 12 or of the gripping head 16 is in one possible embodiment effected such that when a set 2 to be lifted is moved into the stacking position 11, the gripping head 16 is already situated in its bottom lifting position and the entrainment means, which have been moved towards one another, i.e. are in the gripping position, are situated in this case below the transport plane of the conveyor 8. In addition, the gripping and lifting device 12 or the gripping head 16 are in one possible embodiment controlled such that directly after the depositing of the raised set 2 onto a bottom set 2 moved to the stacking position, the entrainment means 17 release the top set 2 and directly after this release, the set stack 13 is ejected onto the external conveyor 14 by way of the downwardly moving gripping head 16.

By using the device 1 it is possible, with a relatively simple, sturdy and consequently also operationally reliable design, to form two-layered set stacks 13, in which the individual sets 2 in each case stand precisely or substantially precisely one on top of the other or are arranged congruently one relative to the other. The stacking of the individual sets 2 is effected as they pass through, i.e. in a continuous or quasi continuous process, in one possible embodiment without the device 1 operating in a stop-and-go manner and without the disadvantages of acceleration and deceleration of drives, machine elements and operating elements etc connected to such an operation.

One feature of the device 1 is also that the forming of the set stack 13 is effected in line without lateral turning and that the gripping head 16 is moved exclusively in the vertical or substantially vertical direction for this purpose.

Figure 2:
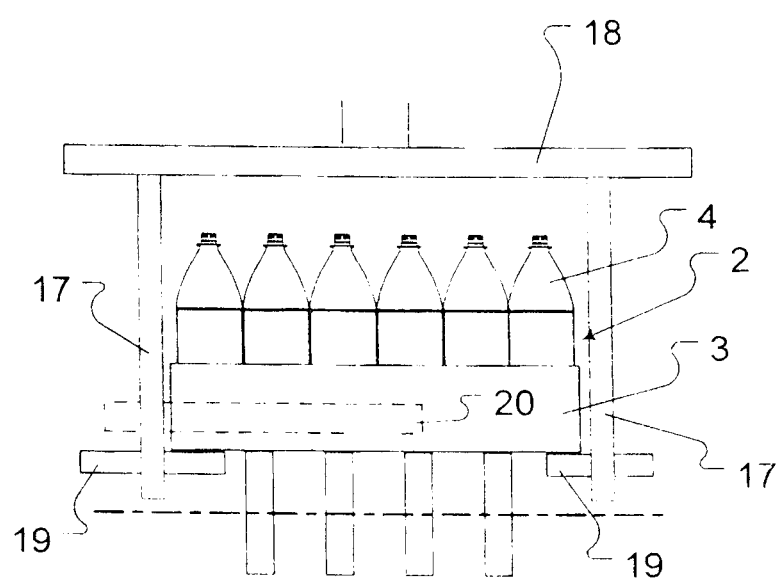
FIG. 2 shows a schematic representation to explain the method of operation of the device in FIG. 1.
Figure 2A:
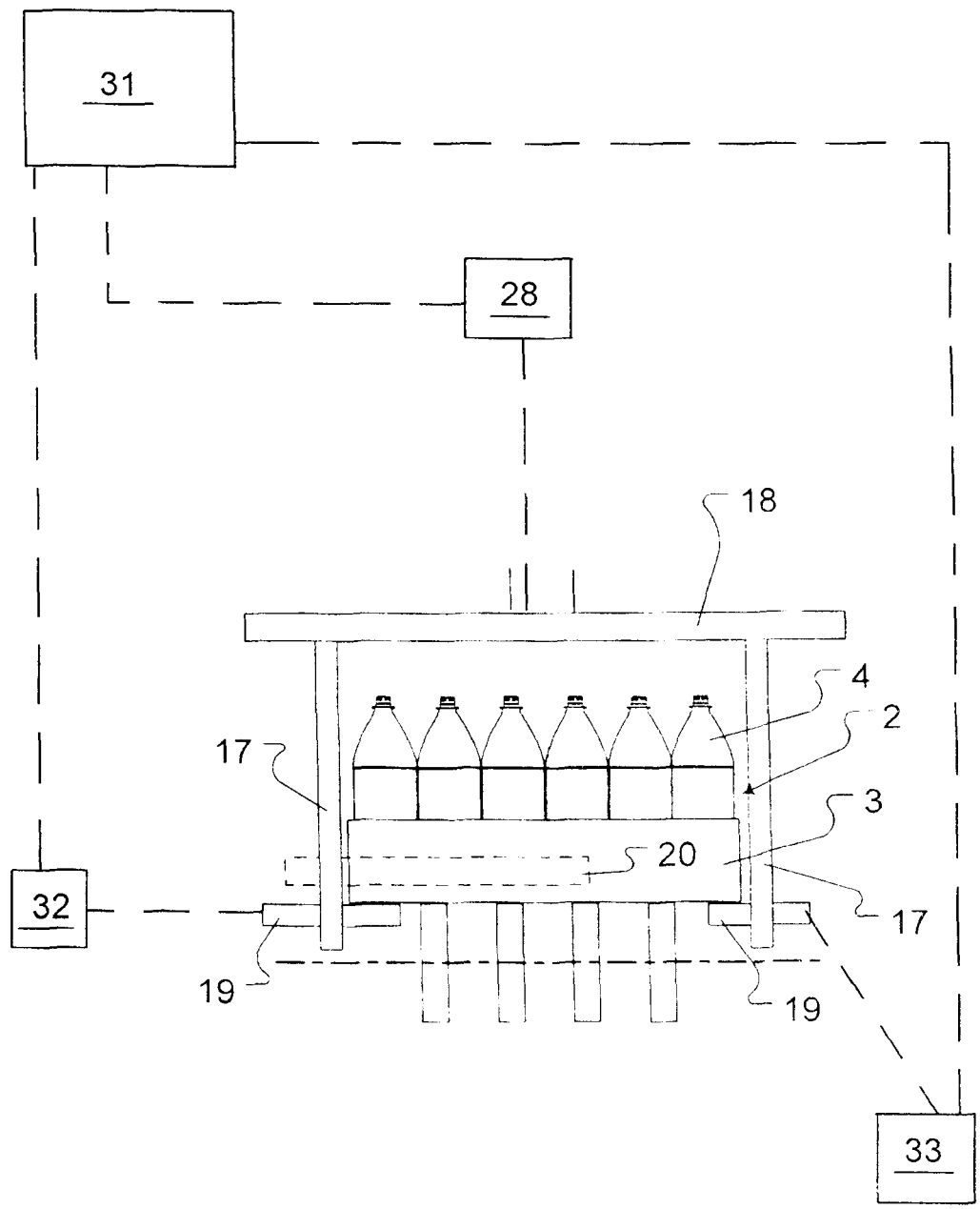
FIG. 2A shows a schematic representation to explain the method of operation of the device in FIG. 1A.

FIG. 2A shows the device 1 of the present application in a view similar to FIG. 2. The gripping head 16 and/or the gripping and lifting device 12 engages a set 2, which is disposed on the conveyor 9. The device 1 also comprises drives 28, 32, and 33 and a control unit 31. The drive 28 controls and/or monitors the gripping head 16 and/or the gripping and lifting device 12. The drives 32 and 33 are configured and disposed to drive the entrainment means 19 to engage with the set 2.

Figure 3:
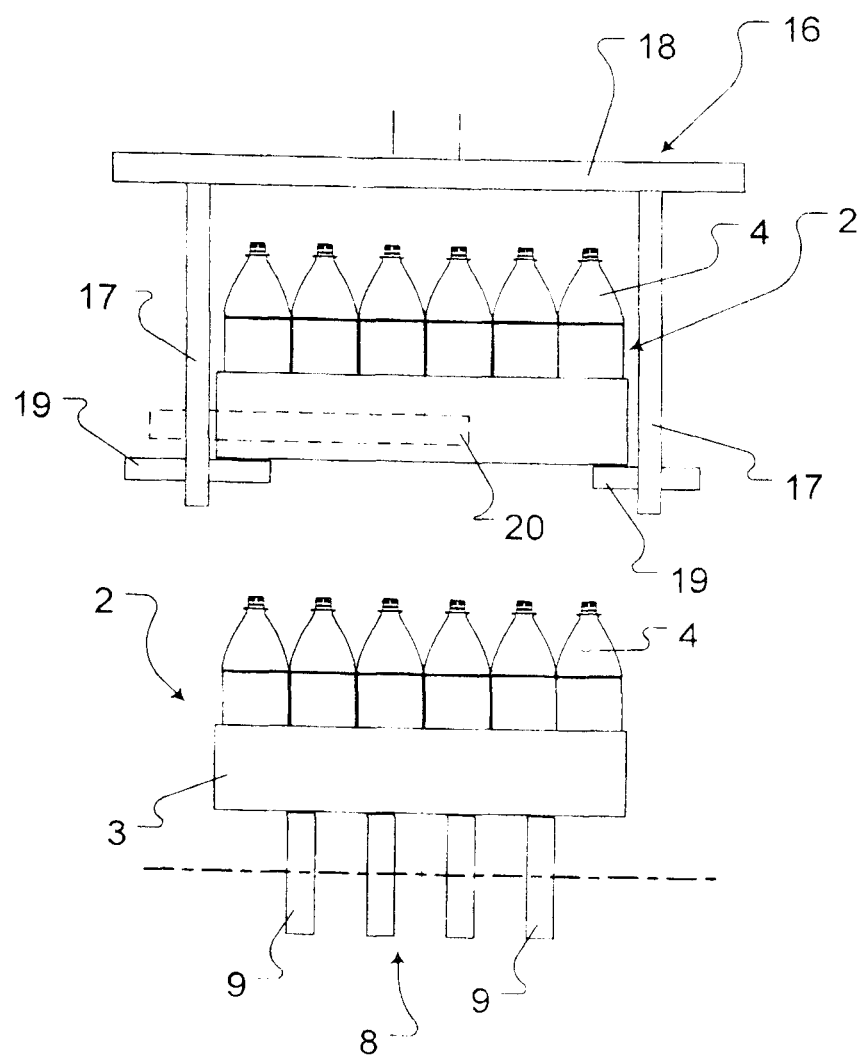
FIG. 3 shows a schematic representation to explain the method of operation of the device in FIG. 1.
Figure 3A:
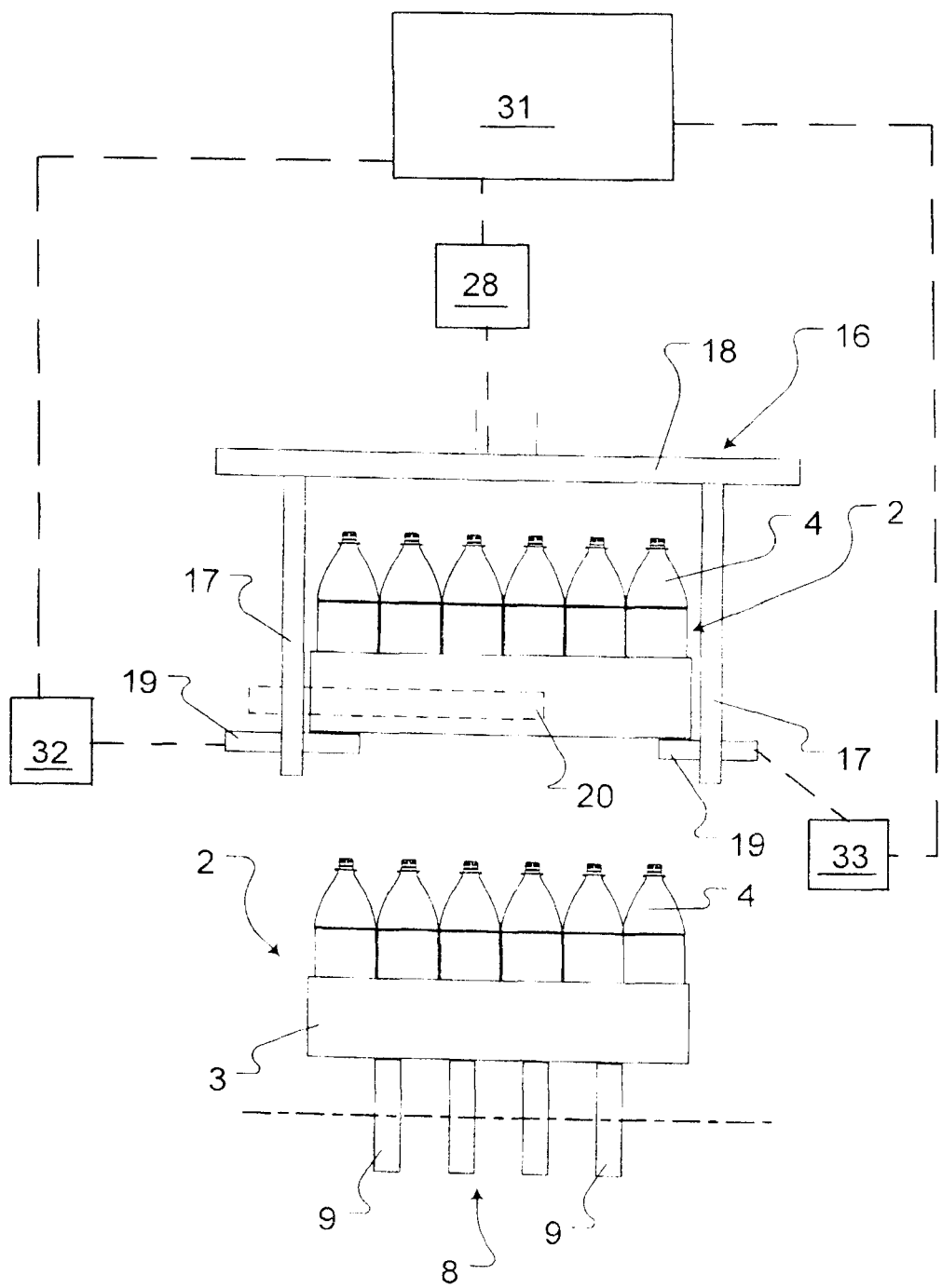
FIG. 3A shows a schematic representation to explain the method of operation of the device in FIG. 1A.

FIG. 3A may show a view similar to FIG. 3 with the additional components of the drives 28, 32, and 33 and the control element 31. The control element 31 may control and/or monitor the drives 28, 32, and 33. The gripping and lifting device 12 and/or gripping head 16 has lifted a set 2 off the conveyor 9, and another set 2 is disposed underneath the top set 2 in the device-internal conveyor 8 on the chains 9. The gripping and lifting device 12 and/or gripping head 16 may then place the top set 2 onto the bottom set 2 to produce a stack 13, which may then be ejected onto the conveyor 14 and transported away from the device 1.

The device 1 can be realized in a cost-efficient and space-saving manner with pneumatics, servo technology or also with mechanical components and is easy to operate and adjust.

The present application has been described above by way of possible embodiments. It is obvious that modifications and conversions are possible without departing from the teaching concept.

Thus, it is possible, for example, to realize the entrainment means 17 provided at the gripping head 16 as rolling means, such that it is possible in this manner that respective sets 2, when moved into the stacking position 11, already abut against the entrainment means 17 of the gripping head 15 moving upwards or the set stack 13 is ejected with the entrainments means 19 still abutting, thereby shortening the clock cycle of the gripping and lifting device and consequently increasing the output of the device 1 even further.

It has been assumed above that set stacks 13 are formed with the device 1 in each case from two sets 2, which in their turn are already secured or held together by a shrunken shrink film 5. It is obviously also possible with sufficient stability of the sets 2 to stack them without any specific fixing by means of a shrunk shrink film 5 to form the set stacks 13 and then, for example to secure just the set stack 13 or the multiple sets in a suitable manner, for example by means of shrink-fitting a shrink film.

In addition, it has also been assumed above that the product groups or sets 2 each comprise a plurality of bottles 4. Obviously the device according to the present application is suitable in general for stacking product groups, i.e. for stacking products combined to form groups, in one possible embodiment for stacking products filled into packaging and combined to form groups. The packaging means, in this case, are in one possible embodiment bags, cans or other hollow-body-like packaging means or containers. In addition, it is also not necessary or may not be desired for the method of operation of the device according to the present application for the products of the product groups to be arranged on a carrier in each case, the products can rather be combined in another manner to form sturdy product groups, i.e. product groups that are able to be manipulated by the device 1 according to the present application.

Figure 4:
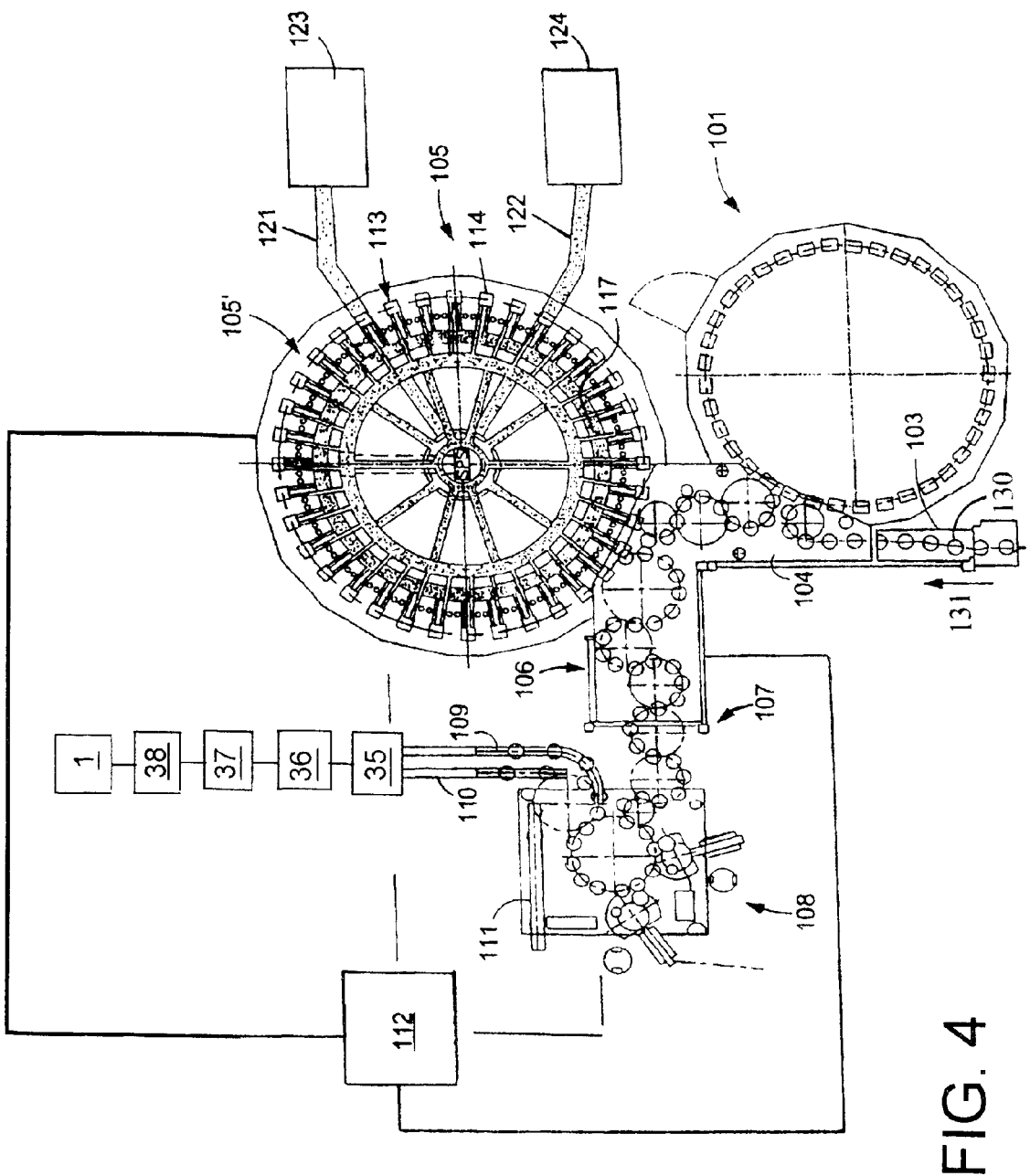
FIG. 4 shows schematically the main components of one possible embodiment example of a system for filling containers, for example, a beverage bottling plant for filling bottles with at least one liquid beverage, in accordance with at least one possible embodiment, in which system or plant could possibly be utilized at least one aspect, or several aspects, of the embodiments disclosed herein.

FIG. 4 shows schematically the main components of one possible embodiment example of a system for filling containers, specifically, a beverage bottling plant for filling bottles 130 with at least one liquid beverage, in accordance with at least one possible embodiment, in which system or plant could possibly be utilized at least one aspect, or several aspects, of the embodiments disclosed herein.

FIG. 4 shows a rinsing arrangement or rinsing station 101, to which the containers, namely bottles 130, are fed in the direction of travel as indicated by the arrow 131, by a first conveyer arrangement 103, which can be a linear conveyor or a combination of a linear conveyor and a starwheel. Downstream of the rinsing arrangement or rinsing station 101, in the direction of travel as indicated by the arrow 131, the rinsed bottles 130 are transported to a beverage filling machine 105 by a second conveyer arrangement 104 that is formed, for example, by one or more starwheels that introduce bottles 130 into the beverage filling machine 105.

The beverage filling machine 105 shown is of a revolving or rotary design, with a rotor 105', which revolves around a central, vertical machine axis. The rotor 105' is designed to receive and hold the bottles 130 for filling at a plurality of filling positions 113 located about the periphery of the rotor 105'. At each of the filling positions 103 is located a filling arrangement 114 having at least one filling device, element, apparatus, or valve. The filling arrangements 114 are designed to introduce a predetermined volume or amount of liquid beverage into the interior of the bottles 130 to a predetermined or desired level.

The filling arrangements 114 receive the liquid beverage material from a toroidal or annular vessel 117, in which a supply of liquid beverage material is stored under pressure by a gas. The toroidal vessel 117 is a component, for example, of the revolving rotor 105'. The toroidal vessel 117 can be connected by means of a rotary coupling or a coupling that permits rotation. The toroidal vessel 117 is also connected to at least one external reservoir or supply of liquid beverage material by a conduit or supply line. In the embodiment shown in FIG. 4, there are two external supply reservoirs 123 and 124, each of which is configured to store either the same liquid beverage product or different products. These reservoirs 123, 124 are connected to the toroidal or annular vessel 117 by corresponding supply lines, conduits, or arrangements 121 and 122. The external supply reservoirs 123, 124 could be in the form of simple storage tanks, or in the form of liquid beverage product mixers, in at least one possible embodiment.

As well as the more typical filling machines having one toroidal vessel, it is possible that in at least one possible embodiment there could be a second toroidal or annular vessel which contains a second product. In this case, each filling arrangement 114 could be connected by separate connections to each of the two toroidal vessels and have two individually-controllable fluid or control valves, so that in each bottle 130, the first product or the second product can be filled by means of an appropriate control of the filling product or fluid valves.

Downstream of the beverage filling machine 105, in the direction of travel of the bottles 130, there can be a beverage bottle closing arrangement or closing station 106 which closes or caps the bottles 130. The beverage bottle closing arrangement or closing station 106 can be connected by a third conveyer arrangement 107 to a beverage bottle labeling arrangement or labeling station 108. The third conveyor arrangement may be formed, for example, by a plurality of starwheels, or may also include a linear conveyor device.

In the illustrated embodiment, the beverage bottle labeling arrangement or labeling station 108 has at least one labeling unit, device, or module, for applying labels to bottles 130. In the embodiment shown, the labeling arrangement 108 is connected by a starwheel conveyer structure to three output conveyer arrangements: a first output conveyer arrangement 109, a second output conveyer arrangement 110, and a third output conveyer arrangement 111, all of which convey filled, closed, and labeled bottles 130 to different locations.

The first output conveyer arrangement 109, in the embodiment shown, is designed to convey bottles 130 that are filled with a first type of liquid beverage supplied by, for example, the supply reservoir 123. The second output conveyer arrangement 110, in the embodiment shown, is designed to convey bottles 130 that are filled with a second type of liquid beverage supplied by, for example, the supply reservoir 124. The third output conveyer arrangement 111, in the embodiment shown, is designed to convey incorrectly labeled bottles 130. To further explain, the labeling arrangement 108 can comprise at least one beverage bottle inspection or monitoring device that inspects or monitors the location of labels on the bottles 130 to determine if the labels have been correctly placed or aligned on the bottles 130. The third output conveyer arrangement 111 removes any bottles 130 which have been incorrectly labeled as determined by the inspecting device.

The beverage bottling plant can be controlled by a central control arrangement 112, which could be, for example, computerized control system that monitors and controls the operation of the various stations and mechanisms of the beverage bottling plant.

Once the bottles 130 have been inspected, the correctly labeled bottles 130 may be transported to a sorter 35. The sorter 35 may be configured and disposed to distribute bottles into a plurality of rows. The plant may also comprise a transporter or grouper 36, which is configured and disposed to group a number of bottles 130 together with a predetermined pitch spacing between each group of bottles 130. Once the bottles 130 have been grouped and spaced apart, the groups of bottles 130 may be transported to a machine 37, which is configured to place trays under the groups of bottles 130 and/or partitions between the bottles 130 of the groups. These groups of bottles 130 may then be transported to a shrink wrapping machine 38, which may wrap the groups of bottles 130 with a shrink wrap and then shrink the shrink wrap to form group sets or packages of bottles. The groups may then be transported to a device 1 of the present application, which places the shrinkwrapped groups on top of one another to form stacks.

The present application relates to a device for stacking product groups 2, comprising a conveyor belt 6, 8, 14 for guiding the product groups into an at least one-track product group flow and for removing the stacked product groups and placing them in a product group stack 13, also comprising a device 12 on the conveyor belt for forming the product group stack. Said device is characterized in that the device for forming the product group stack is a gripping and lifting device comprising at least one gripper head 16.

One feature or aspect of an embodiment is believed at the time of the filing of this patent application to possibly reside broadly in a device for stacking product groups 2, said device comprising a transport section 6, 9, 14 for supplying the product groups 2 in an at least single-lane product group flow and for discharging the product groups 2 stacked to form a product group stack 13 as well as a device 12 on the transport section to form the product group stack 13, wherein the device to form the product group stack 13 is a gripping and lifting device 12 with at least one gripping head 16, which is moveable in a controlled manner up and down in the vertical or substantially vertical direction such that a leading product group 2, in each case of two product groups 2 following one another in the conveying direction A of the transport section 6, 8, 14, is engaged and raised by the gripping head 16 at a stacking position 11 and is then deposited onto a following product group 2 that has reached the stacking position 11.

Yet another feature or aspect of an embodiment is believed at the time of the filing of this patent application to possibly reside broadly in the device, comprising a device-internal conveyor 8, by way of which the product groups 2 supplied to the device 1 are each moved to the stacking position 11 of the gripping and lifting device 12.

Still another feature or aspect of an embodiment is believed at the time of the filing of this patent application to possibly reside broadly in the device, wherein the lifting movement B of the gripping head 16 is synchronized with the conveying movement of the transport section 6, 8, 14 or of the device-internal conveyor 8.

A further feature or aspect of an embodiment is believed at the time of the filing of this patent application to possibly reside broadly in the device, wherein the at least one gripping head 16 has entrainment means 19, which are controllable between an operative state for gripping and holding the product group 2 to be raised in each case and an inoperative state for releasing said product group 2.

Another feature or aspect of an embodiment is believed at the time of the filing of this patent application to possibly reside broadly in the device, wherein the entrainment means 19 are formed by moveable, for example axially moveable fingers.

Yet another feature or aspect of an embodiment is believed at the time of the filing of this patent application to possibly reside broadly in the device, comprising means 20 for the precise or substantially precise positioning of each product group 2 engaged by the gripping head 16 in the gripping head 16 prior to said product group being deposited onto another product group 2 located at the stacking position 11.

Still another feature or aspect of an embodiment is believed at the time of the filing of this patent application to possibly reside broadly in the device, wherein the means 20 for positioning are provided at the at least one gripping head 16.

A further feature or aspect of an embodiment is believed at the time of the filing of this patent application to possibly reside broadly in the device, wherein the means 20 for positioning are formed by brackets that are pivotable in a controlled manner.

Another feature or aspect of an embodiment is believed at the time of the filing of this patent application to possibly reside broadly in the device, wherein the entrainment means 19 are situated below a transport plane of the product groups 2 in the bottom position of the lifting movement B of the at least one gripping head 16.

Yet another feature or aspect of an embodiment is believed at the time of the filing of this patent application to possibly reside broadly in the device, wherein in the top position of the lifting movement B of the at least one gripping head 16, the entrainment means 19 are situated at a level above the top side of the product groups 2 at the stacking position 11.

Still another feature or aspect of an embodiment is believed at the time of the filing of this patent application to possibly reside broadly in the device, wherein the at least one gripping head 16 is controlled in such a manner that the respective product group 2 engaged and raised by said gripping head 16 is situated in the top lifting position of the gripping head 16 at a spacing above another product group 2 moved to the stacking position 11, and in that the placing of the product group 2 engaged by the gripping head 16 onto the other product group 2 is effected by lowering the gripping head 16 or during the return stroke of the gripping head 16 into the bottom lifting position.

A further feature or aspect of an embodiment is believed at the time of the filing of this patent application to possibly reside broadly in the device, wherein the device-internal conveyor 8 is formed by at least one endlessly driven belt-like and/or chain-like transport element 9.

One feature or aspect of an embodiment is believed at the time of the filing of this patent application to possibly reside broadly in the device, wherein the at least one transport element 9 together with an upper loop length form a transport plane or transport surface on which the product groups 2 stand.

Another feature or aspect of an embodiment is believed at the time of the filing of this patent application to possibly reside broadly in the device, wherein the at least one transport element 9 is realized with entrainment means 10 that interact with the product groups 2.

Yet another feature or aspect of an embodiment is believed at the time of the filing of this patent application to possibly reside broadly in the device, wherein the device-internal conveyor 8 is formed by a plurality of transport elements 9 located parallel or substantially parallel to each other and driven in an endlessly rotating manner.

Still another feature or aspect of an embodiment is believed at the time of the filing of this patent application to possibly reside broadly in the device, comprising means for creating a predetermined machine spacing between the product groups 2 that follow one after another in the transport direction A, at least when moving to the stacking position 11.

A further feature or aspect of an embodiment is believed at the time of the filing of this patent application to possibly reside broadly in the device, wherein the drives at least of the device-internal conveyor 9, of the lifting movement of the at least one gripping head 16, of the entrainment means 19 at the gripping head 16 as well as, where applicable, also of the means 20 for positioning are synchronized in such a manner that the product groups 2 are stacked as they pass through, i.e. in a continuous or quasi continuous operation of the device 1.

Another feature or aspect of an embodiment is believed at the time of the filing of this patent application to possibly reside broadly in the device, wherein the drives at least of the device-internal conveyor 8, of the lifting movement of the at least one gripping head 16, of the entrainment means 19 at the gripping head 16 as well as, where applicable, also of the means 20 for positioning are synchronized in such a manner that the product groups 2 are stacked as they pass through, i.e. in a continuous or quasi continuous operation of the device 1.

Yet another feature or aspect of an embodiment is believed at the time of the filing of this patent application to possibly reside broadly in the device, comprising its embodiment for stacking product groups 2 in the form of sets, in each case comprising a plurality of containers or bottles 4 assembled together to form such a set 2.

One feature or aspect of an embodiment is believed at the time of the filing of this patent application to possibly reside broadly in a process for the continuous stacking of products 2, with a transportation route 6, 9, 14 for feeding the products 2 in a least-track product flow and for discharging the into product stacks 13 stacked products 2 and with a body 12 on the transportation route to the formation of the product stack 13, wherein the device for forming the product stack 13, a gripper and lifting device 12 with at least one gripper head 16, wherein the gripper head 16 of the vertically or substantially vertically controlled and down moved on, and two lateral guide sections or walls 17, the top of the gripper head 16 in an appropriate manner by at least one crossbar 18 are connected to, which two each in the transport direction A the transport route 6, 8, 14 consecutive products 2 an anticipatory product group 2 to a stacking position 11 by the gripper head 16 collected, raised vertically or substantially vertically and then subsequent to, to the stacking position 11 came product group 2 disposed, wherein the at least one gripping head 16 entrainment means 19, between a working state for grasping and holding the respective lifted product group 2 and an inactive state to share this product group 2 can be controlled and where the stacking of containers 2 container stacking 13 line continuously or substantially continuously in the side reacting done without and by the container 2 on the outer carrier 6 continuously or substantially continuously supplied and the inner with 8 continuously or substantially continuously stacking position 11 moves the carrier.

Another feature or aspect of an embodiment is believed at the time of the filing of this patent application to possibly reside broadly in the method, wherein when two transport direction A succession of containers 2 that in the transport direction following package 2 only to the stacking position 11 reached when the transport direction of anticipatory in containers 2 with the gripper—and lifting device 12 has a position above the movement path of the next container is lifted in two already.

Yet another feature or aspect of an embodiment is believed at the time of the filing of this patent application to possibly reside broadly in the method, wherein the placement of the gripper and lifting device 12 raised container on the bottom, at the stack position 11, existing containers 2 and the pushing out of the packages 2 is continuous or substantially continuous.

Still another feature or aspect of an embodiment is believed at the time of the filing of this patent application to possibly reside broadly in a device for stacking of products 2, with a transportation route 6, 9, 14 for feeding the products 2 in a least-track product flow and for discharging the into product stacks 13 stacked products 2 and with a device 12 on the transport route for the formation of the product stack, 13 wherein the device for forming the product stacking 13 a gripper and lifting device 12 with at least one gripper head 16, wherein the gripper head 16 vertically or substantially vertically controlled up and down can be moved and two lateral guide sections or walls 17, the top of the gripper head 16 in an appropriate manner by at least one crossbar 18 are connected to, making two in the conveying direction A the transport route 6, 8, 14 consecutive products 2 an anticipatory Product Group 2 to a stack position 11 by the gripper head 16 recorded increased vertical or substantially vertical and then a subsequent, to the stacking position 11 reached Product Group 2, wherein the at least one gripping head 16 entrainment means 19, between a working state for grasping and holding the respective lifted Product Group 2 and an inactive state for releasing this product group 2 can be controlled are.

A further feature or aspect of an embodiment is believed at the time of the filing of this patent application to possibly reside broadly in the method, comprising a device-internal conveyor 8, with which the device 1 supplied products 2 each to the stacking position 11 of the gripper and lifting device 12 moved.

Another feature or aspect of an embodiment is believed at the time of the filing of this patent application to possibly reside broadly in the method, wherein stroke B of the gripper head 16 with the conveying movement of the transport route 6, 8, 14 or the device-internal conveyor 8 is synchronized or substantially synchronized to.

Yet another feature or aspect of an embodiment is believed at the time of the filing of this patent application to possibly reside broadly in the method, wherein the carriers 19 of, for example, formed axially movable fingers are moving.

Still another feature or aspect of an embodiment is believed at the time of the filing of this patent application to possibly reside broadly in the method, comprising means 20 for exact positioning of each with the gripper head 16 covered Product Group 2 in the gripper head 16, before weaning to another in the stack position 11 being the product group 2.

A further feature or aspect of an embodiment is believed at the time of the filing of this patent application to possibly reside broadly in the method, wherein the means 20 at least one of the gripper head 16, are positioning.

Another feature or aspect of an embodiment is believed at the time of the filing of this patent application to possibly reside broadly in the method, wherein the means 20 controlled positioning of swivel brackets are made for.

Yet another feature or aspect of an embodiment is believed at the time of the filing of this patent application to possibly reside broadly in the method, wherein the lower position of the lifting movement B of the at least one gripper the head 16 the entrainment means 19 below a level of the transport of products 2 are subject to.

Still another feature or aspect of an embodiment is believed at the time of the filing of this patent application to possibly reside broadly in the method, wherein the driver 28 in the top position of the lifting movement B of the at least one gripper head 16 at a level above the top of the product groups 2 at the stack position 11 are.

A further feature or aspect of an embodiment is believed at the time of the filing of this patent application to possibly reside broadly in the method, wherein the at least one gripper head 16 controlled such that each of this gripper head 16 captured and raised product group 2 in the top stroke position of the gripper head 16 with distance above another, to the stacking position 11 moving product group 2 is located, and that the setting up of the gripper head 16 covered Product Group 2 to the other, product group 2 by lowering the gripper head 16 or during the return stroke of the gripper head 16 in the bottom stroke position is.

One feature or aspect of an embodiment is believed at the time of the filing of this patent application to possibly reside broadly in the method, wherein the one transport element 9 with an upper loop length, a transport layer or transport surface form at least, the product groups 2 get up to.

Another feature or aspect of an embodiment is believed at the time of the filing of this patent application to possibly reside broadly in the method, wherein the one 9 with the product groups 2 cooperating catches 10 which is the transportation element, at least.

Yet another feature or aspect of an embodiment is believed at the time of the filing of this patent application to possibly reside broadly in the method, wherein the carrier device-internal conveyor 8 of parallel position to each other endlessly circulating driven transport element 9 is formed more.

Still another feature or aspect of an embodiment is believed at the time of the filing of this patent application to possibly reside broadly in the method, comprising means for generating a predetermined distance between the machines in the transport direction A consecutive products 2 at least when moving to the stacking position 11.

A further feature or aspect of an embodiment is believed at the time of the filing of this patent application to possibly reside broadly in the method, wherein the drives of at least the device-internal conveyor 9, the lifting movement of the at least one gripper head 16, entrainment means 19 on the gripper head 16 and possibly also of the means 20 for Position are synchronized or substantially synchronized such that a stack of product groups 2 in the run, i.e. in a continuous or quasi continuous operation of the device 1 takes place.

Another feature or aspect of an embodiment is believed at the time of the filing of this patent application to possibly reside broadly in the method, comprising their training for stacking of products 2 in the form of containers each comprising a plurality of such containers 2 combined containers or bottles 4.

One feature or aspect of an embodiment is believed at the time of the filing of this patent application to possibly reside broadly in a device for stacking of products 2, with a transportation route 6, 9, 14 for feeding the products 2 in a least-track product flow and for discharging the into product stacks 13 stacked products 2 and with a device 12 on the transport route for the formation of the product stack 13, wherein the device for forming the product stack 13, a gripper and lifting device 12 with at least one gripper head 16, wherein the gripper head 16 vertically or substantially vertically controlled up and down movable, and wherein two each in the transport direction A the transport route 6, 8, 14 consecutive products 2 an anticipatory Product Group 2 to a stacking position 11 by the gripper head 16 recorded increased vertical and subsequent, to the stacking position 11 came Product Group 2 sold is one then, said at least one gripping head 16 dog 19, between a working state for grasping and holding the respective lifted Product Group 2 and an inactive state for releasing this product group 2 are controllable, wherein the gripper head 16, two lateral guide sections or walls 17, the mutually parallel or substantially parallel to the transport direction A and are arranged in parallel or substantially parallel, and the movement of this guide walls 17 is equal to the movement of the traverse 18.

Another feature or aspect of an embodiment is believed at the time of the filing of this patent application to possibly reside broadly in the method, wherein through the device-internal conveyor 8, the device 1 supplied products 2 each to the stacking position 11 of the rapier and the lifting device 12 are movable.

Yet another feature or aspect of an embodiment is believed at the time of the filing of this patent application to possibly reside broadly in the method, wherein lifting movement B of the gripper head 16 with the conveying movement of the transport route 6, 8, 14 or the device-internal conveyor 8 is synchronized or substantially synchronized to.

Still another feature or aspect of an embodiment is believed at the time of the filing of this patent application to possibly reside broadly in the method, wherein the entrainment means 19 of, for example, formed axially movable fingers are moving.

A further feature or aspect of an embodiment is believed at the time of the filing of this patent application to possibly reside broadly in the method, comprising means 20 for exact positioning of each with the gripper head 16 covered product group 2 in the gripper head 16, before weaning to another in the stack position 11 being the product group 2.

Another feature or aspect of an embodiment is believed at the time of the filing of this patent application to possibly reside broadly in the method, wherein the means 20 at least one of the gripper head 16, are positioning.

Yet another feature or aspect of an embodiment is believed at the time of the filing of this patent application to possibly reside broadly in the method, wherein the means 20 controlled positioning of swivel brackets are made for.

Still another feature or aspect of an embodiment is believed at the time of the filing of this patent application to possibly reside broadly in the method, wherein the lower position of the lifting direction B of the at least one gripper the head 16 the entrainment means 19 below a level of the transport of products 2 are subject to.

A further feature or aspect of an embodiment is believed at the time of the filing of this patent application to possibly reside broadly in the method, wherein the entrainment means 19 in the top position of the lifting movement B of the at least one gripper head 16 at a level above the top of the product groups 2 at the stack position 11 are.

Another feature or aspect of an embodiment is believed at the time of the filing of this patent application to possibly reside broadly in the method, wherein the at least one gripper head 16 controlled such is that each of this gripper head 16 captured and raised product group 2 in the top stroke position of the gripper head 16 with distance above another, to the stacking position 11 moving product group 2 is located, and that the setting up of the gripper head 16 covered Product Group 2 to the other, product group 2 by lowering the gripper head 16 or during the return stroke of the gripper head 16 in the bottom stroke position is.

Yet another feature or aspect of an embodiment is believed at the time of the filing of this patent application to possibly reside broadly in the method, wherein the one transport element 9 with an upper loop length of a transport layer or transport surface form at least, of the products 2 get up to.

Still another feature or aspect of an embodiment is believed at the time of the filing of this patent application to possibly reside broadly in the method, wherein the one transport element 9 with the product groups 2 cooperating catches 10 which is the transportation element, at least.

A further feature or aspect of an embodiment is believed at the time of the filing of this patent application to possibly reside broadly in the method, wherein the device-internal conveyor 8 of parallel position to each other endlessly circulating driven transport element 9 is formed more.

One feature or aspect of an embodiment is believed at the time of the filing of this patent application to possibly reside broadly in the method, comprising means for generating a predetermined distance between the machines in the transport direction A consecutive products 2 at least when moving to the stacking position 11.

Another feature or aspect of an embodiment is believed at the time of the filing of this patent application to possibly reside broadly in the method, wherein the drives of at least the transport element 9, the lifting movement of the at least one gripper head 16, entrainment means 19 on the gripper head 16 and possibly also of the means 20 for position are synchronized such that a stack of product groups 2 in the run, i.e. in a continuous or quasi continuous operation of the device 1 takes place.

Yet another feature or aspect of an embodiment is believed at the time of the filing of this patent application to possibly reside broadly in the method, comprising their training for stacking of products 2 in the form of containers each comprising a plurality of such containers 2 combined containers or bottles 4.

Still another feature or aspect of an embodiment is believed at the time of the filing of this patent application to possibly reside broadly in a process for the continuous stacking of products 2 wherein device according to the present application is used, with each second product group 2 continuously or substantially continuously being promoted.

A further feature or aspect of an embodiment is believed at the time of the filing of this patent application to possibly reside broadly in the method, wherein when two transport direction A succession of products 2 the direction of transport following product group 2 only in the stacking position 11 passes, where the forward direction of anticipatory in product group 2 with the gripper- and lifting device 12 has a position above the path of movement of the following product group 2 is increased in already.

Another feature or aspect of an embodiment is believed at the time of the filing of this patent application to possibly reside broadly in the method, wherein the withdrawal of the gripper and lifting device 12 elevated product group 2 to the bottom, at the stack position 11 waiting product group 2 and the pushing out of the product group 2 is continuous or substantially continuous.

Yet another feature or aspect of an embodiment is believed at the time of the filing of this patent application to possibly reside broadly in a method of operating a container filling plant, which container filling plant is configured to fill, close, and package containers such as bottles, cans, and other containers, and stack packages of filled and closed containers, said method comprising the steps of: feeding containers into a container filling machine; filling containers with a liquid material in said container filling machine; feeding filled containers out of said container filling machine and into a container closing machine; closing filled containers in said container closing machine; feeding closed, filled containers out of said container closing machine and into a container packaging machine; packaging closed, filled containers into packages of filled, closed containers; feeding packages of filled, closed containers into a package stacking machine with a first conveyor in at least one stream of packages; transporting a first package of filled, closed containers into a stacking device of said package stacking machine with a package stacking machine conveyor, which stacking device comprises: a gripping head being configured and disposed to move substantially vertically from above the conveyor; an entrainment arrangement being configured and disposed to: move from below a package to support the package with said gripping head; upon being in an operative state, grip and hold a package of filled, closed containers; and upon being in an inoperative state, release a package of filled, closed containers; two guide walls being configured and disposed move substantially vertically with said gripping head; and a crossbeam being configured and disposed to interconnect said two guide walls at the top side of said gripping head and being operatively connected with said gripping head; lowering said gripping head, said two guide walls, and said crossbeam of said stacking device toward said first package of filled, closed containers; gripping said first package of filled, closed containers with said gripping head from above; lifting said gripping head, said entrainment arrangement, said two guide walls, said crossbeam, and said first package of filled, closed containers substantially vertically above said package stacking machine conveyor; transporting a second package of filled, closed containers into said stacking device of said package stacking machine with said package stacking machine conveyor; moving said gripping head and said entrainment arrangement and thus releasing said first package of filled, closed containers and stacking said first package of filled, closed containers on top of said second package of filled, closed containers in said stacking device and forming a stack of packages at a stacking station in said package stacking machine; transporting said stack of packages out of said stacking device of said package stacking machine; and feeding stacks of packages out of said package stacking machine with a second conveyor.

One feature or aspect of an embodiment is believed at the time of the filing of this patent application to possibly reside broadly in a method of operating a container filling plant, which container filling plant is configured to fill, close, and package containers such as bottles, cans, and other containers, and stack packages of filled and closed containers, said method comprising the steps of: feeding containers into a container filling machine; filling containers with a liquid material in said container filling machine; feeding filled containers out of said container filling machine and into a container closing machine; closing filled containers in said container closing machine; feeding closed, filled containers out of said container closing machine and into a container packaging machine; packaging closed, filled containers into packages of filled, closed containers; feeding packages of filled, closed containers into a package stacking machine with a first conveyor in at least one stream of packages; transporting a first package of filled, closed containers into a stacking device of said package stacking machine with a package stacking machine conveyor, which stacking device comprises: a gripping head being configured and disposed to move substantially vertically from above the conveyor; an entrainment arrangement being configured and disposed to: move from below a package to support the package with said gripping head; upon being in an operative state, grip and hold a package of filled, closed containers; and upon being in an inoperative state, release a package of filled, closed containers; said entrainment arrangement being operatively connected to said gripping head and being configured to move with said gripping head; two guide walls being configured and disposed move substantially vertically with said gripping head; and a crossbeam being configured and disposed to interconnect said two guide walls at the top side of said gripping head and being operatively connected with said gripping head; lowering said gripping head, said two guide walls, and said crossbeam of said stacking device toward said first package of filled, closed containers; gripping said first package of filled, closed containers with said gripping head from above; lifting said gripping head, said entrainment arrangement, said two guide walls, said crossbeam, and said first package of filled, closed containers substantially vertically above said package stacking machine conveyor; transporting a second package of filled, closed containers into said stacking device of said package stacking machine with said package stacking machine conveyor; moving said gripping head and said entrainment arrangement and thus releasing said first package of filled, closed containers and stacking said first package of filled, closed containers on top of said second package of filled, closed containers in said stacking device and forming a stack of packages at a stacking station in said package stacking machine; transporting said stack of packages out of said stacking device of said package stacking machine; and feeding stacks of packages out of said package stacking machine with a second conveyor.

Another feature or aspect of an embodiment is believed at the time of the filing of this patent application to possibly reside broadly in the method, wherein said method further comprises the step of substantially continuously moving said second package of filled, closed containers through said stacking device of said package stacking machine.

Yet another feature or aspect of an embodiment is believed at the time of the filing of this patent application to possibly reside broadly in the method, wherein said method further comprises the step of lifting said first package of filled, closed containers above the path of movement of said second package of filled, closed containers.

Still another feature or aspect of an embodiment is believed at the time of the filing of this patent application to possibly reside broadly in the method, wherein the steps of said method are performed quasi continuously.

A further feature or aspect of an embodiment is believed at the time of the filing of this patent application to possibly reside broadly in the method, wherein: said package stacking machine conveyor is configured to supply packages of filled, closed containers to said package stacking station of said stacking device; and said method further comprises supplying packages of filled, closed containers to said package stacking station of said stacking device.

Another feature or aspect of an embodiment is believed at the time of the filing of this patent application to possibly reside broadly in the method, wherein: said gripping head is configured to move substantially synchronously with at least one of: said package stacking machine conveyor, said first conveyor, and said second conveyor; said method further comprises moving said gripping head substantially synchronously with at least one of: said package stacking machine conveyor, said first conveyor, and said second conveyor; said entrainment arrangement comprises axially moveable fingers; said stacking device comprises a positioning arrangement, which positioning arrangement is configured to position a first package of filled, closed containers engaged by said gripping head in said gripping head prior to the first package of filled, closed containers being deposited onto a second package of filled, closed containers located at said stacking station; said method further comprises positioning said first package of filled, closed containers engaged by said gripping head in said gripping head with said positioning arrangement prior to said first package of filled, closed containers being deposited onto said second package of filled, closed containers located at said stacking station; said positioning arrangement is disposed at said gripping head; said positioning arrangement comprises brackets, which brackets are configured to be pivotable in a controlled manner; said method further comprises pivoting said brackets of said positioning arrangement in a controlled manner; upon said gripping head being lowered toward a first package of filled, closed containers, said entrainment arrangement is configured to be situated below the first package of filled, closed containers; said method further comprises situating said entrainment arrangement below said first package of filled, closed containers upon said gripping head being lowered toward said first package of filled, closed containers; upon said gripping head being moved vertically and a first package of filled, closed containers being lifted, said entrainment arrangement is configured to be situated at a level above a second package of filled, closed containers in said stacking station; said method further comprises situating said entrainment arrangement at a level above said second package of filled, closed containers in said stacking station upon said gripping head being moved vertically and a first package of filled, closed containers being lifted; said package stacking machine conveyor comprises a transport element configured to convey packages from said first conveyor to said second conveyor; said method further comprises conveying packages from said first conveyor to said second conveyor with said transport element of said package stacking machine conveyor; said transport element comprises an upper loop length, which upper loop length forms a transport surface on which packages of filled, closed containers are moved; said transport element comprises an engaging arrangement configured to interact packages of filled, closed containers; said method further comprises interacting said engaging arrangement with packages of filled, closed containers; said package stacking machine conveyor comprises said transport element; said package stacking machine comprises a spacing arrangement configured to space packages of filled, closed containers a predetermined machine spacing apart as the packages of filled, closed containers are transported to said stacking station; said method further comprises spacing packages of filled, closed containers a predetermined machine spacing apart with said spacing arrangement as packages of filled, closed containers are transported to said stacking station; said package stacking machine conveyor comprises a drive; said gripping head comprises a drive; said entrainment arrangement comprises a drive; said positioning element comprises a drive; said drives of said package stacking machine conveyor, said gripping head, said entrainment arrangement, and said positioning element are configured to be substantially synchronized in such a manner that packages of filled, closed containers are quasi continuously stacked as the packages of filled, closed containers pass through said package stacking machine; and said method further comprises synchronizing said drives of said package stacking machine conveyor, said gripping head, said entrainment arrangement, and said positioning element and quasi continuously stacking packages of filled, closed containers as said packages of filled, closed containers pass through said package stacking machine.

Yet another feature or aspect of an embodiment is believed at the time of the filing of this patent application to possibly reside broadly in an arrangement for performing a method of operating a container filling plant, which container filling plant is configured to fill, close, and package containers such as bottles, cans, and other containers, and stack packages of filled and closed containers, said arrangement comprising: a container filling machine configured to fill containers; a container closing machine configured to close filled containers; a container packaging machine configured to package filled, closed containers; a first conveyor configured to feed packages of filled, closed containers to a package stacking machine; a package stacking machine configured to stack packages of filled, closed containers; a stacking device comprising: a gripping head configured to move substantially vertically; an entrainment arrangement configured to: upon being in an operative state, grip and hold a package of filled, closed containers; and upon being in an inoperative state, release a package of filled, closed containers; two guide walls configured to move substantially vertically with said gripping head; and a crossbeam configured to interconnect and move with said two guide walls at the top side of said gripping head; and a second conveyor configured to feed stacks of packages out of said package stacking machine.

Still another feature or aspect of an embodiment is believed at the time of the filing of this patent application to possibly reside broadly in the arrangement, wherein said arrangement comprises a device-internal conveyor configured to supply packages of filled, closed containers to said package stacking station of said stacking device.

A further feature or aspect of an embodiment is believed at the time of the filing of this patent application to possibly reside broadly in the arrangement, wherein said gripping head is configured to move substantially synchronously with at least one of: said device-internal conveyor, said first conveyor, and said second conveyor.

Another feature or aspect of an embodiment is believed at the time of the filing of this patent application to possibly reside broadly in the arrangement, wherein said entrainment arrangement comprises axially moveable fingers.

Yet another feature or aspect of an embodiment is believed at the time of the filing of this patent application to possibly reside broadly in the arrangement, wherein said arrangement comprises a positioning arrangement, which positioning arrangement is configured to position a first package of filled, closed containers engaged by said gripping head in said gripping head prior to the first package of filled, closed containers being deposited onto a second package of filled, closed containers located at said stacking station.

Still another feature or aspect of an embodiment is believed at the time of the filing of this patent application to possibly reside broadly in the arrangement, wherein said positioning arrangement is disposed at said gripping head.

A further feature or aspect of an embodiment is believed at the time of the filing of this patent application to possibly reside broadly in the arrangement, wherein said positioning arrangement comprises brackets, which brackets are configured to be pivotable in a controlled manner.

One feature or aspect of an embodiment is believed at the time of the filing of this patent application to possibly reside broadly in the arrangement, wherein, upon said gripping head being lowered toward a first package of filled, closed containers, said entrainment arrangement is configured to be situated below the first package of filled, closed containers.

Another feature or aspect of an embodiment is believed at the time of the filing of this patent application to possibly reside broadly in the arrangement, wherein, upon said gripping head being moved vertically and a first package of filled, closed containers being lifted, said entrainment arrangement is configured to be situated at a level above a second package of filled, closed containers in said stacking station.

Yet another feature or aspect of an embodiment is believed at the time of the filing of this patent application to possibly reside broadly in the arrangement, wherein said gripping head is configured to: engage and raise a first package of filled, closed containers above a second package of filled, closed containers moved into said stacking station; and lower and place the first package of filled, closed containers onto the second package of filled, closed containers.

Still another feature or aspect of an embodiment is believed at the time of the filing of this patent application to possibly reside broadly in the arrangement, wherein: said package stacking machine comprises a transport element configured to convey packages from said first conveyor to said second conveyor; said transport element comprises an upper loop length, which upper loop length forms a transport surface on which packages of filled, closed containers are moved; said transport element comprises an engaging arrangement configured to interact packages of filled, closed containers; said device-internal conveyor comprises said transport element; said arrangement comprises a spacing arrangement configured to space packages of filled, closed containers a predetermined machine spacing apart as the packages of filled, closed containers are transported to said stacking station; said device-internal conveyor comprises a drive; said gripping head comprises a drive; said entrainment arrangement comprises a drive; said positioning element comprises a drive; and said drives of are configured to be substantially synchronized in such a manner that packages of filled, closed containers are quasi continuously stacked as they pass through said package stacking machine.

A further feature or aspect of an embodiment is believed at the time of the filing of this patent application to possibly reside broadly in a device for stacking of products, with a transport section for feeding the products in an at least single-lane product flow and for discharging the products stacked to form product group stacks and with a device on the transport section for the formation of the product stack, wherein the device for forming the product stack is a gripper and lifting device with at least one gripper head, wherein the gripper head is movable in a controlled manner up and down in the vertical direction, such that a leading product, in each case of two products following one another in the transport direction of the transport route, is engaged and raised by the gripper head at a stacking position and is then deposited onto a following product group that has reached the stacking position, wherein the at least one gripping head comprises a dog, which is controllable between an operative state for gripping and holding the respective lifted product and an inoperative state for releasing this product, wherein the gripper head, with two lateral guide sections or walls that are mutually parallel to the transport direction and are arranged substantially parallel, and a crossbeam, wherein the movement of the guide walls is equal to the movement of the crossbeam.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein except for the exceptions indicated herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

All of the patents, patent applications or patent publications, except for the exceptions indicated herein, which were cited in the International Search Report dated Apr. 16, 2009, and/or cited elsewhere are hereby incorporated by reference as if set forth in their entirety herein, as follows: DE 33 12 006, having the following English translation of the German title "Palletting machine for containers," published on Oct. 4, 1984; U.S. Pat. No. 4,212,579, having the title "METHOD AND APPARATUS FOR STACKING BALES," published on Jul. 15, 1980; and U.S. Pat. No. 1,557,765, having the title "AUTOMATIC STOP," published on Oct. 20, 1925.

All of the patents, patent applications or patent publications, except for the exceptions indicated herein, which were cited in the German Office Action dated Oct. 14, 2008, and/or cited elsewhere are hereby incorporated by reference as if set forth in their entirety herein, as follows: DE 35 29 071, having the following English translation of the German title "APPARATUS FOR STACKING PACKAGES IN PARTICULAR FOR WRAPPING INSTALLATIONS USING A STRIP OF HEAT-SHRINKABLE MATERIAL," published on Feb. 27, 1986; and DD 205 146, having the German title "VORRICHTUNG ZUM PALETTIEREN QUADERFOERMIGER GUETER, INSBESONDERE VON OBSTSTEIGEN," filed on May 17, 1982.

The Innopack packaging machine, manufactured by KHS Maschinen and Anlagenbau AG, is an example of a packaging machine which may possibly be utilized or adapted for use in at least one possible embodiment. Some other examples of packaging machines which may possibly be utilized or adapted for use in at least one possible embodiment may possibly be found in the following U.S. patents: U.S. Pat. No. 4,964,260, entitled "Packaging machine for cardboard boxes and process for packaging articles in cardboard boxes;" U.S. Pat. No. 4,785,610, entitled "Automatic machine for packaging products of different kinds in boxes;" U.S. Pat. No. 5,265,398, entitled "Automatic counting and boxing machine;" U.S. Pat. No. 5,943,847, entitled "Packaging machine for multi-packs;" U.S. Pat. No. 5,937,620, entitled "Packaging machine for multi-packs;" U.S. Pat. No. 5,711,137, entitled "Packaging machine and method of packaging articles;" and U.S. Pat. No. 5,706,633, entitled "Packaging machine and method of packaging articles."

Some examples of position sensors or position sensor systems that may be used or adapted for use in at least one possible embodiment of the present invention may be found in the following U.S. patents: U.S. Pat. No. 5,794,355, issued to inventor Nickum on Aug. 18, 1998; U.S. Pat. No. 5,520,290, issued to inventors Kumar et al. on May 28, 1996; U.S. Pat. No. 5,074,053, issued to inventor West on Dec. 24, 1991; and U.S. Pat. No. 4,087,012, issued to inventor Fogg on May 2, 1978.

Some examples of partition inserters which may possibly be utilized or adapted for use in at least one possible embodiment may include the ZPI-400 for inserting corrugated partitions made by Moen Industries, 12333 Los Nietos Rd., Santa Fe Springs, Calif. 90670; the SF-400 Partition Inserter by Wayne Automation Corporation, 605 General Washington Ave., Norristown, Pa. 19403; the Model 70 partition opener/inserter by A-B-C Packaging Machine Corporation, 811 Live Oak Street, Tarpon Springs, Fla. 34689; and the YH1400 partition inserter by Pearson Packaging Systems, 8120 West Sunset Highway, Spokane, Wash. 99224. Another example of a partition inserter may possibly be found in U.S. Pat. No. 5,600,936, entitled "Suspended modular partition inserter."

Some examples of shrink wrapping machines or machines for wrapping items in plastic film which may possibly be utilized or adapted for use in at least one possible embodiment may possibly be found in the following U.S. patents: U.S. Pat. No. 6,826,893, entitled "Apparatus for wrapping products with plastic film;" U.S. Pat. No. 6,739,115, entitled "Equipment for wrapping groups of products in plastic film;" U.S. Pat. No. 5,878,555, entitled "Apparatus for wrapping articles in plastic film;" U.S. Pat. No. 5,787,691, entitled "Apparatus for wrapping articles in plastic film;" U.S. Pat. No. 5,519,983, entitled "Shrink wrap packaging system with an ultrasonic side sealer;" U.S. Pat. No. 4,956,963, entitled "Method of sealing a shrink wrap package;" U.S. Pat. No. 4,873,814, entitled "Method of making a shrink wrap package;" U.S. Pat. No. 4,214,419, entitled "Collating and shrink wrap packaging apparatus;" U.S. Pat. No. 6,484,475, entitled "Modular packaging machine;" U.S. Pat. No. 4,694,633, entitled "Film wrapping machine;" U.S. Pat. No. 4,118,916, entitled "Thermoplastic wrapping machine;" U.S. Pat. No. 4,118,916, entitled "Thermoplastic wrapping machine;" U.S. Pat. No. 5,371,999, entitled "Shrink film wrapping machine;" U.S. Pat. No. 4,748,795, entitled "Film wrapping machine;" and U.S. Pat. No. 5,115,620, entitled "Wrapping machine."

One example of a sorter, which may possibly be utilized or adapted for use in at least one possible embodiment of the present application, may possibly be found in U.S. patent application Ser. No. 12/372,252, titled "CONVEYING APPARATUS FOR THE CONVEYING OF BEVERAGE BOTTLES FROM A BEVERAGE BOTTLE TREATMENT MACHINE TO A BEVERAGE BOTTLE PACKAGING MACHINE IN A BEVERAGE BOTTLING PLANT, AND A CONVEYING APPARATUS FOR THE CONVEYING OF PRODUCTS FROM A PRODUCT TREATMENT MACHINE TO A PRODUCT PACKAGING MACHINE," and filed on Feb. 17, 2009.

One example of a grouper, which may possibly be utilized or adapted for use in at least one possible embodiment of the present application, may possibly be found in U.S. patent application Ser. No. 12/410,999, titled "METHOD AND APPARATUS FOR TRANSPORTING GROUPS OF FILLED BEVERAGE BOTTLES TO A BEVERAGE BOTTLE PACKAGING MACHINE IN A BEVERAGE BOTTLING PLANT, AND A METHOD AND APPARATUS FOR TRANSPORTING GROUPS OF CONTAINERS TO A CONTAINER HANDLING MACHINE IN A CONTAINER PROCESSING PLANT," and filed on Mar. 25, 2009. Another example of a grouper, which may possibly be utilized or adapted for use in at least one possible embodiment of the present application, may possibly be found in U.S. patent application Ser. No. 12/706,601, titled "METHOD OF ARRANGING CONTAINERS, SUCH AS BOTTLES OR CANS, FOR FORMING GROUPS OF CONTAINERS TO BE PACKAGED AS A GROUP IN A CONTAINER FILLING PLANT, AND APPARATUS THEREFOR," filed on Feb. 16, 2010.

The patents, patent applications, and patent publications listed above in the preceding paragraphs are herein incorporated by reference as if set forth in their entirety except for the exceptions indicated herein. The purpose of incorporating U.S. patents, Foreign patents, publications, etc. is solely to provide additional information relating to technical features of one or more embodiments, which information may not be completely disclosed in the wording in the pages of this application. However, words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned words in this sentence, when not used to describe technical features of one or more embodiments of the patents, patent applications, and patent publications, are not considered to be incorporated by reference herein.

The corresponding foreign and international patent publication applications, namely, Federal Republic of Germany Patent Application No. 10 2008 010 259.8, filed on Feb. 20, 2008, having inventor Maiweg TORSTEN, and DE-OS 10 2008 010 259.8 and DE-PS 10 2008 010 259.8, and International Application No. PCT/EP2009/000853, filed on Feb. 6, 2009, having WIPO Publication No. WO 2009/103433 and inventor Maiweg TORSTEN, are hereby incorporated by reference as if set forth in their entirety herein, except for the exceptions indicated herein, for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, except for the exceptions indicated herein, are hereby incorporated by reference as if set forth in their entirety herein.

The purpose of incorporating the corresponding foreign equivalent patent application(s), that is, PCT/EP2009/000853 and German Patent Application 10 2008 010 259.8, is solely for the purpose of providing a basis of correction of any wording in the pages of the present application, which may have been mistranslated or misinterpreted by the translator. However, words relating to opinions and judgments of the author and not directly relating to the technical details of the description of the embodiments therein are not to be incorporated by reference. The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned word in this sentence, when not used to describe technical features of one or more embodiments of the patents, patent applications, and patent publications, are not generally considered to be incorporated by reference herein.

Statements made in the original foreign patent applications PCT/EP2009/000853 and DE 10 2008 010 259.8 from which this patent application claims priority which do not have to do with the correction of the translation in this patent application are not to be included in this patent application in the incorporation by reference. Any statements about admissions of prior art in the original foreign patent applications PCT/EP2009/000853 and DE 10 2008 010 259.8 are not to be included in this patent application in the incorporation by reference, since the laws relating to prior art in non-U.S. Patent Offices and courts may be substantially different from the Patent Laws of the United States.

All of the references and documents cited in any of the documents cited herein, except for the exceptions indicated herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

AT LEAST PARTIAL NOMENCLATURE

1 Device for stacking product groups
2 Product group or set
3 Carrier or tray
4 Bottle or container
5 Shrink film
6 External conveyor for supplying the product groups
7 Standby position of the device 1
8 Device-internal conveyor
9 Transport chain
10 Entrainment means on transport chain 9
11 Stacking position of the device 1
12 Gripping and lifting device
13 Set stack or multi-layered set
14 External transport element
15 Device frame
16 Gripping head
17 Guiding wall
18 Crossbeam
19 Entrainment means
20 Positioning element
A Conveying direction
B Lifting direction of the gripping and lifting device 12 or of the gripper 15

What is claimed is:

1. A product group stacking arrangement comprising:
a conveying arrangement configured to continuously move in a substantially horizontal transport direction;
a gripping and lifting device configured to grip a first product group being moved by said conveying arrangement at a stacking position, and then raise the first product group substantially solely in a vertical direction away from said conveying arrangement, and then lower the first product group substantially solely in the vertical direction onto a subsequent, second product group being continuously moved by said conveying arrangement through the stacking position;
said gripping and lifting device comprises a gripping head; and
said gripping head comprises a positioning element configured to position the first product group in said gripping head prior to the first product group being deposited onto the second product group.

2. The product group stacking arrangement according to claim 1, wherein:
said gripping and lifting device comprises a vertical lifting arrangement configured to move said gripping head; and
said gripping head comprises moveable fingers configured to be axially extended into engagement with the first product group to lift the first product group, and to be axially retracted out of engagement with the first product group to release the first product group.

3. The product group stacking arrangement according to claim 2, wherein said positioning element comprises a pivotable bracket configured to move the first product group in said gripping head in a direction substantially parallel to said transport direction to align the first product group with the second product group.

4. The product group stacking arrangement according to claim 3, wherein:
said gripping head comprises at least one crossbeam and two lateral guide walls connected by said at least one crossbeam; and
said guide walls are disposed parallel to each other and substantially parallel to said transport direction.

5. The product group stacking arrangement according to claim 4, wherein:
said conveying arrangement comprises a conveyor, the overall width of which is less than the width of a product group; and
said gripping head is configured to be raised in a synchronous manner with the conveying movement of said conveying arrangement or of said conveyor.

6. The product group stacking arrangement according to claim 5, wherein:
said conveyor defines a transport plane on which the product groups are conveyed;
said movable fingers are configured to be disposed below said transport plane upon said gripping head being disposed at a lowermost lifting position, to be disposed above the top of the second product group upon said gripping head being disposed at an uppermost lifting position; and
said conveyor comprises: at least one belt or chain, and entrainment structures configured to engage product groups.

7. The product group stacking arrangement according to claim 6, wherein:
said conveyor comprises a plurality of belts or chains disposed parallel or substantially parallel to each other and driven in an endlessly rotating manner;
said product group stacking arrangement is configured to create a predetermined spacing between successive product groups, at least when moving product groups to the stacking position; and
the operation and/or movement of said conveyor, said gripping head, said entrainment arrangement, and said positioning arrangement are synchronized such that one product group is stacked onto another, moving product group in a continuous stacking operation, and wherein the stacking arrangement is configured to stack groups of containers, bottles, or cans.

8. The product group stacking arrangement according to claim 1, wherein said positioning element comprises a pivotable bracket configured to move the first product group in said gripping head in a direction substantially parallel to said transport direction to align the first product group with the second product group.

9. The product group stacking arrangement according to claim 1, wherein:
said gripping and lifting device comprises a vertical lifting arrangement configured to move said gripping head;
said gripping head comprises at least one crossbeam and two lateral guide walls connected by said at least one crossbeam; and
said guide walls are disposed parallel to each other and substantially parallel to said transport direction.

10. The product group stacking arrangement according to claim 9, wherein:
said gripping head comprises an entrainment arrangement;
said entrainment arrangement comprises two sets of movable fingers, each supported at a lower portion of a corresponding one of said guide walls; and
said movable fingers are configured to be axially extended into the space between said guide walls and into engagement with the first product group to lift the first product group, and to be axially retracted out of the space between said guide walls and out of engagement with the first product group to release the first product group.

11. A method of stacking product groups comprising:
continuously moving a conveying arrangement in a substantially horizontal transport direction;
gripping, with a gripping head of a gripping and lifting device, a first product group being moved by said conveying arrangement at a stacking position, and then raising said first product group substantially solely in a vertical direction away from said conveying arrangement; and
positioning said first product group in said gripping head, and then lowering said first product group substantially solely in the vertical direction onto a subsequent, second product group being continuously moved through the stacking position.

12. The method according to claim 11, wherein:
said step of gripping comprises axially extending movable fingers of said gripping head and engaging said first product group with said movable fingers;
said step of lifting comprises moving said gripping head using a vertical lifting arrangement of said gripping and lifting device; and
said method further comprises axially retracting said movable fingers out of engagement with said first product group to release said first product group onto said second product group.

13. The method according to claim 12, wherein said step of positioning comprises contacting said first product group with a pivotable bracket and thereby moving said first product group in said gripping head in a direction substantially parallel to said transport direction to align said first product group with said second product group.

14. The method according to claim 11, wherein said step of positioning comprises contacting said first product group with a pivotable bracket and thereby moving said first product group in said gripping head in a direction substantially parallel to said transport direction to align said first product group with said second product group.

15. The method according to claim 11, wherein:
said method comprises moving said first product group between first and second lateral guide walls of asaid gripping head of said gripping and lifting device;
said step of gripping comprises axially extending a first set of movable fingers supported at a lower portion of said first guide wall, and a second set of movable fingers supported at a lower portion of said second guide wall, into the space between said guide walls, such that said sets of movable fingers are disposed underneath said first product group on either side of said first product group;
said step of lifting comprises moving said gripping head using a vertical lifting arrangement of said gripping and lifting device; and
said method further comprises axially retracting said movable fingers out of the space between said guide walls and out of engagement with said first product group to release said first product group onto said second product group.

16. The method according to claim 11, wherein said method comprises stacking product groups comprising groups of containers, bottles or cans.

\* \* \* \* \*